United States Patent [19]
Parker

[11] Patent Number: 5,228,410
[45] Date of Patent: Jul. 20, 1993

[54] SAFE ENTRY FOR BIRD HOUSES

[76] Inventor: Willard B. Parker, 10433 Spiva Rd., Sacramento, Calif. 95829

[21] Appl. No.: 761,447

[22] Filed: Sep. 18, 1991

[51] Int. Cl.$^5$ .............................................. A01K 31/02
[52] U.S. Cl. ........................................ 119/26; 119/23
[58] Field of Search .............................. 119/23, 24, 26

[56] References Cited

U.S. PATENT DOCUMENTS

| | | | |
|---|---|---|---|
| 1,209,979 | 12/1916 | Larson | 119/23 |
| 1,951,550 | 3/1934 | Little | 119/26 |
| 3,244,148 | 5/1966 | Long | 119/23 |
| 4,841,910 | 6/1989 | Kilham | 119/26 |
| 4,846,110 | 7/1989 | Reynolds | 119/23 |

FOREIGN PATENT DOCUMENTS 410220  5/1934  United Kingdom ............... 119/57.8

Primary Examiner—John G. Weiss

[57] ABSTRACT

An accessory device for bird houses which allows entrance of smaller birds, while restraining larger ones. A wirelike material forming a cagelike body, with both ends open, thereby creating a passageway, with a first open end attached over and aligned with the entrance hole of a bird house and a second open end extending away from the bird house and forming an opening of a size which restricts larger birds.

5 Claims, 2 Drawing Sheets

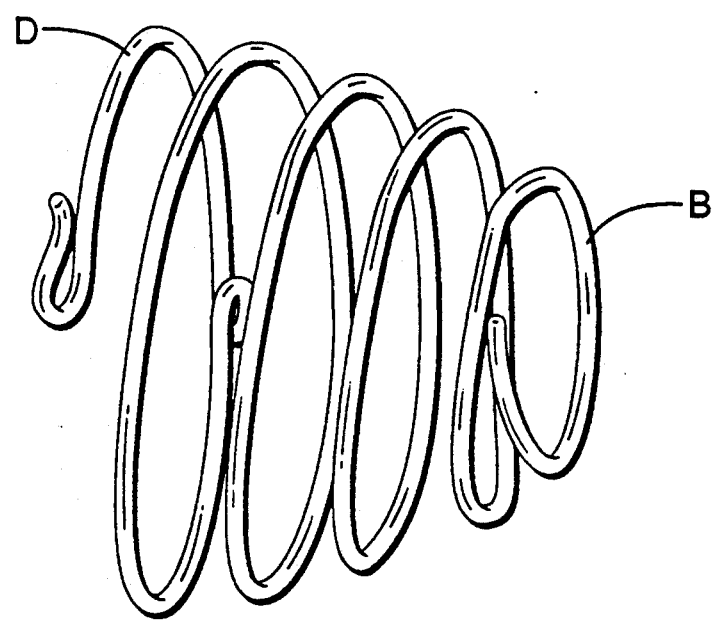
FIG. — 1
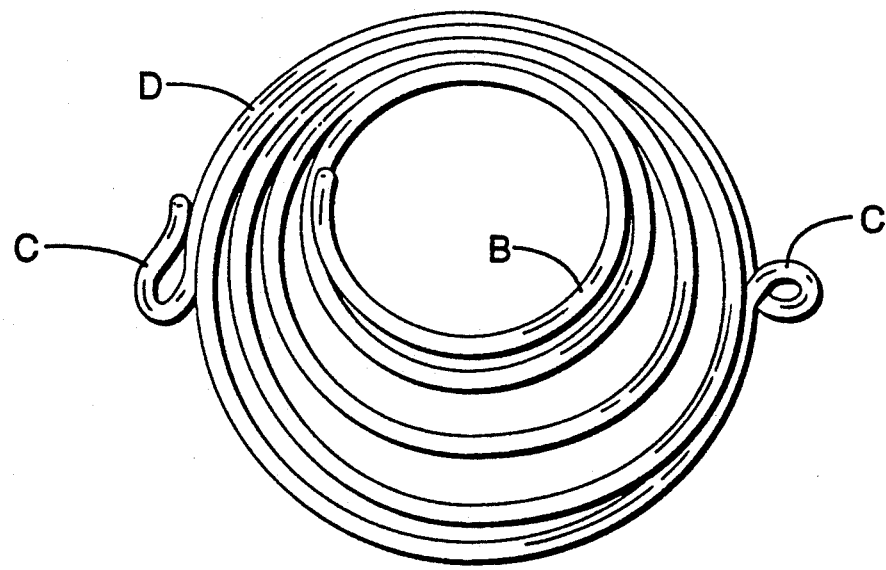
FIG. — 2

SAFE ENTRY FOR BIRD HOUSES

FIELD OF THE INVENTION

The invention relates to accessory devices for bird houses and particularly to protection for nestlings.

OBJECT OF THE INVENTION

Bird houses are increasingly popular around homes, not only for the enjoyment of seeing birds, but also for the decorative and artistic value of the bird houses themselves. Construction of deep houses which have the entrance hole situated much higher from the bottom has been the rule for a long time, but almost invariably the birds in their fervor, build the nest right up to the entrance hole, leaving the contents vulnerable, especially to Jays and Crows. As bird watchers will attest, the slaughter goes on.

SUMMARY OF THE INVENTION

An accessory device for bird houses which allows entrance of smaller birds, while restraining larger ones. The device can be described as a cagelike or framelike enclosure or barrier which attaches over the entrance hole of a bird house, with the purpose of preventing larger birds from getting close enough to the bird house entry hole to penetrate the house with their bills or beaks and destroying eggs and nestlings.

The device has openings at both ends. A first open end, also called the base, which is attached to the bird house wall surrounding the entrance hole, is necessarily larger in diameter or cross section to keep predators' bill or beaks from getting close enough to penetrate the house entrance hole.

A second open end, also called the entry, is necessarily smaller in size with a most used diameter of 1½ inches, which allows entrance of Bluebirds, Tree Swallow and Finch etc. size birds. If, for example, House Wrens are to be attracted, said second open end opening would be reduced to between 1 and 1¼ inches. If larger birds are desired residents then said second open end would be increased, in that case, only larger predators would be restricted.

The wire like material of which it is contructed, must be of sufficient temper to generally keep its shape, and sufficient flexibility so that the farthest end opening can be adjusted in size with tools like plyers, thereby the device can be adapted to protect different size birds.

The device is purposely designed to be as open and the least enclosed as possible, and still foil the predators.

Because of the openness of the design, as opposed to a more enclosed form, the following benefits are derived:

The desired birds are much less fearful of entering. The parent birds can be seen in their numerous enterings and exiting of the enclosure. Visibility into the inside of the house is virtually unaffected. As is visability for the young birds who often want to see the world outside though not ready to venture there.

The parent birds often appear to enjoy standing and even reclining in the wire like enclosure, facing outward, enjoying the scene and fresh air, while still being close to their nest and young and still at a distance to avoid being pestered by them.

The birds can be seen standing in the enclosure, feeding their young over much of the course of their rearing and later tempting them with food, out to the farthest end, just before the young leave the house permanently.

Economy of Manufacture: Because the device can be formed from a single length of wire, the low cost of the device should preclude expense being a hindrance to its purchase and use.

Aesthetics: The device, specifically of the round coil design does not have the appearance of a contrived or mechanical device. It simulates a counterpart in nature, i.e., the tendrills of a vine which often entwine in circular coils. In any case, its appearance is pleasing to many bird watchers and blends with Nature.

BRIEF DESCRIPTION OF THE DRAWING

The drawing has three figures.

In FIG. 1 is shown a side, slightly frontal view of the safe entry device.

In FIG. 2 is shown a front, slightly lower view of the safe entry device.

DETAILED DESCRIPTION

Figure 3:
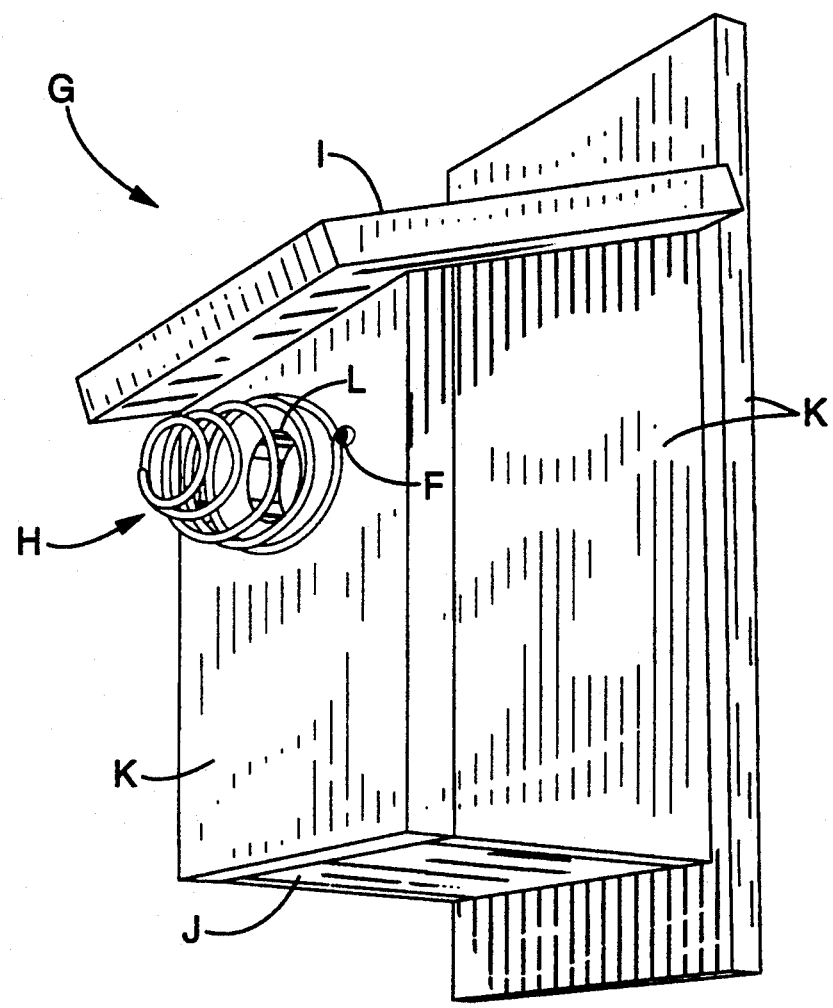
In FIG. 3 is shown a side slightly frontal view of a birdhouse and safe entry device combination.

While this invention may be adapted to different, but generally similar forms, there is depicted in the drawings a specific form with the understanding that this is an exemplification of the idea of the invention, which is not intended to be limited to the specific illustration.

Turning now to the drawings, there is shown the coil spring shaped entry device H, which attaches over the entrance hole L, of a bird house G, by use of fasteners F, through 2 loops C, which are formed in the first open end, also called the base attached coil D. The base coil D, is larger in diameter to prevent predators' bills and beaks from getting into the bird house entrance hole. The second open end, also called the entry coil B, is of a size to allow desired birds to enter. Bluebirds, Tree Swallows and Finch size birds are acceptable of a 1½ inch entry B. And this size will restrict the predator birds. The entry coil B, can be adjusted with tools like plyers so that different size birds can be allowed entry. If for example, House Wrens are to be attracted, the entry coil B would be reduced to between 1 and 1¼ inches in diameter. The length can be approximately 2½ inches, which foils the normal predators.

In FIG. 3 is shown a safe entry device H, in combination with a birdhouse G. The bird house G, is shown with a top 1, bottom J, and sidewalls K, extending between the top and bottom wall. An entrance hole L, is formed in one sidewall K, over which the safe entry device H, is attached by fastening said device H, to the area of the sidewall K, surrounding the entrance hole L.

Although, the descriptions and drawings, herein, describe specific forms, various modifications may be made without departing from the true principles of the invention, and that limitation is not to these specifics, except, as indicated by the scope of the appended claims.

What is claimed is:

1. An accessory device for a birdhouse which allows entrance of smaller birds, while restraining larger birds from said birdhouse, comprising:
   a wire like material coiled in a helical manner forming a cagelike body with two open ends creating a passageway through said cagelike body,
   a first open end of the cagelike body formed by a base coil, adapted to lay against the birdhouse, said base coil having a plurality of attachment loops formed along its length to accommodate a fastening means to anchor the cagelike body to a wall area which surrounds an entrance hole of a birdhouse, a second open end of the cagelike body, opposite said first open end, formed by an entry coil spaced from the base to restrict large birds from access into the birdhouse.

2. A device as claimed in claim 1, wherein, said cagelike body is of a conical shaped coil spring, with said first open end formed of said base coil, which is the largest in diameter and additional circular coils which taper down in diameter to said second open end forming a smaller entry coil, and thus a smaller entrance.

3. A device claimed in claim 1, wherein said wire like material is of sufficient temper strength to generally keep its protective shape, when larger birds attempt to penetrate the bird house, and being of sufficient flexibility that said second end opening can be adjusted in size with the used of tools, thereby the size of the cagelike body can be adjusted to provide protection for different size birds.

4. A device as claimed in claim 1, wherein said wirelike material is composed of plastic.

5. A safe entry device in combination with a bird house to provide housing for smaller birds while restricting access of larger birds into the bird house, said combination comprising:

said birdhouse having a top, a bottom wall and side walls extending between the top and bottom wall, with an entrance hole formed in a side wall, said entry device contructed from a wirelike material coiled in a helical manner forming a cagelike body, with two open ends creating a passage way through said cagelike body, a first open end of the cagelike body formed by a base coil which lies against the side wall of the birdhouse, said base coil having a plurality of attachment loops formed along its length to accomodate fasteners that attach the entry device to the side wall over the entrance hole, a second open end of the entry device, opposite said first open end, formed by an entry coil spaced from the base coil and sized to restrict large birds from access into the birdhouse.

* * * * *